United States Patent
Zerner

(10) Patent No.: US 7,100,885 B2
(45) Date of Patent: Sep. 5, 2006

(54) SEAT MOUNTING RAIL, PARTICULARLY FOR A COMMERCIAL AIRCRAFT

(75) Inventor: Ingo Zerner, Syke (DE)

(73) Assignee: Airbus Deutschland GmbH, Hamburg (DE)

( * ) Notice: Subject to any disclaimer, the term of this patent is extended or adjusted under 35 U.S.C. 154(b) by 112 days.

(21) Appl. No.: 11/018,589

(22) Filed: Dec. 20, 2004

(65) Prior Publication Data

US 2005/0133666 A1 Jun. 23, 2005

(30) Foreign Application Priority Data

Dec. 19, 2003 (DE) .............................. 103 60 807

(51) Int. Cl.
*A47B 97/00* (2006.01)
*B64C 1/00* (2006.01)
*B64C 30/00* (2006.01)
*B64D 11/06* (2006.01)
*B64D 13/00* (2006.01)

(52) U.S. Cl. ................. 248/503.1; 244/118.6; 244/117 R

(58) Field of Classification Search ............ 244/117 R, 244/118.1, 118.2, 118.6, 119, 122 R; 248/503.1, 248/424, 429; 52/729.1, 729.2
See application file for complete search history.

(56) References Cited

U.S. PATENT DOCUMENTS

| RE21,921 E | * | 10/1941 | Greulich | ................... 52/729.2 |
|---|---|---|---|---|
| 3,596,421 A | * | 8/1971 | Miller | ........................... 52/333 |
| 3,642,054 A | * | 2/1972 | Nowak | ........................ 164/461 |
| 4,475,701 A | | 10/1984 | Martin | |
| 4,723,732 A | * | 2/1988 | Gorges | ..................... 244/118.6 |
| 4,856,738 A | * | 8/1989 | Martin | .................... 244/122 R |
| 4,869,421 A | * | 9/1989 | Norris et al. | ............... 228/181 |
| 5,688,426 A | * | 11/1997 | Kirkwood et al. | .......... 219/633 |
| 5,925,205 A | * | 7/1999 | Zimmermann et al. | ..... 156/150 |
| 6,068,214 A | * | 5/2000 | Kook et al. | .............. 244/118.1 |
| 6,498,297 B1 | | 12/2002 | Samhammer | |
| 6,554,225 B1 | * | 4/2003 | Anast et al. | ............ 244/117 R |
| 2003/0054182 A1 | * | 3/2003 | Keener et al. | ............... 428/457 |
| 2004/0040252 A1 | * | 3/2004 | Beral et al. | ................ 52/729.3 |
| 2004/0129445 A1 | * | 7/2004 | Winkelbach et al. | ......... 174/76 |
| 2005/0156095 A1 | | 7/2005 | Vichniakov et al. | |
| 2005/0211844 A1 | * | 9/2005 | Ricaud | ................... 244/122 R |
| 2006/0088725 A1 | * | 4/2006 | Ruggiero et al. | ........... 428/650 |

FOREIGN PATENT DOCUMENTS

EP 0 922 632 6/1999
GB 2 320 183 6/1998

OTHER PUBLICATIONS

Aluminum Standards and Data, Sixth Edition, Mar. 1979, Alloy and Temper Designation Systems for Aluminum (ANSI H35.1—1978), pp. 7 to 15.

* cited by examiner

*Primary Examiner*—Teri Pham Luu
*Assistant Examiner*—Joshua Michener
(74) *Attorney, Agent, or Firm*—W. F. Fasse; W. G. Fasse

(57) ABSTRACT

A seat mounting rail for securing seats to a floor of a passenger aircraft is made of a seat securing upper section and a rail mounting lower section. Both sections are made of different metals. The upper section is made of a titanium alloy for corrosion protection. The lower rail section is made of an aluminum alloy for weight reduction. The interconnection between the two sections is made as a thermal joint for example formed as a laser weld, which is preferably a butt weld to save welding material.

9 Claims, 1 Drawing Sheet

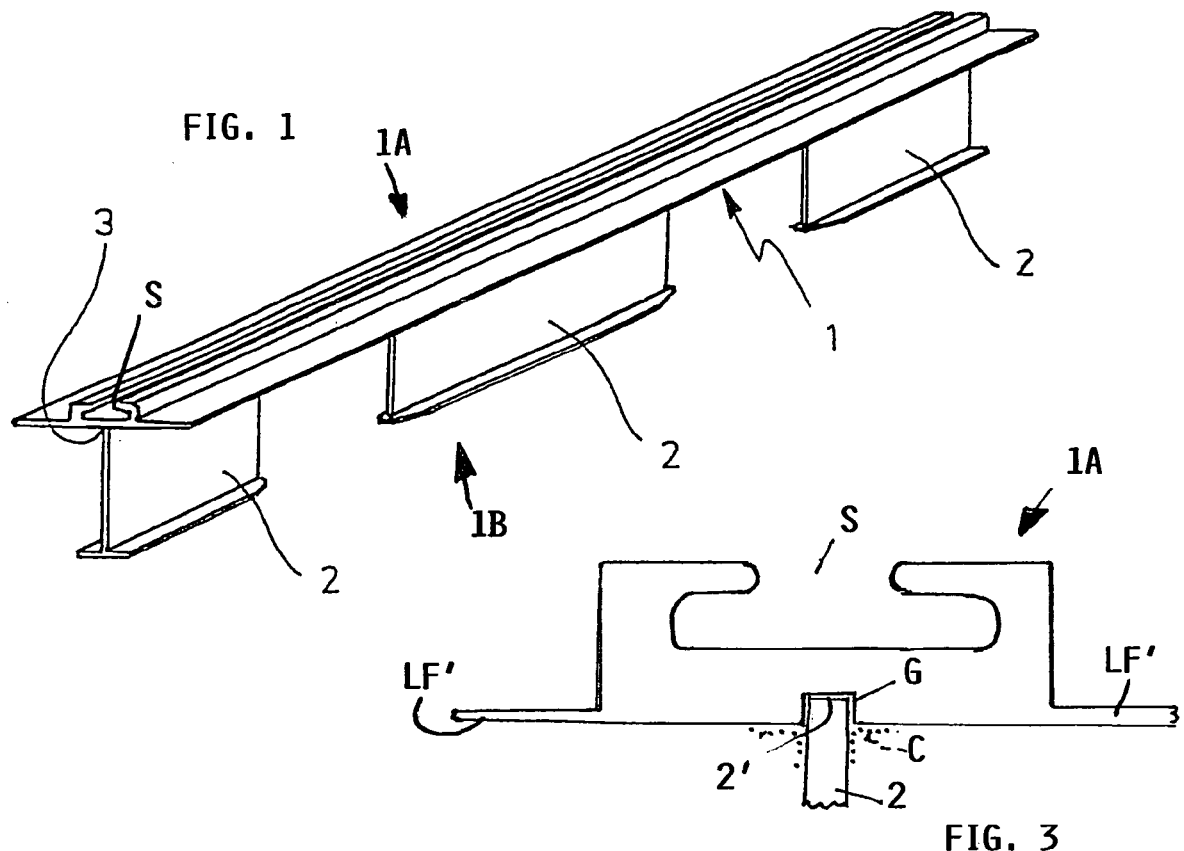
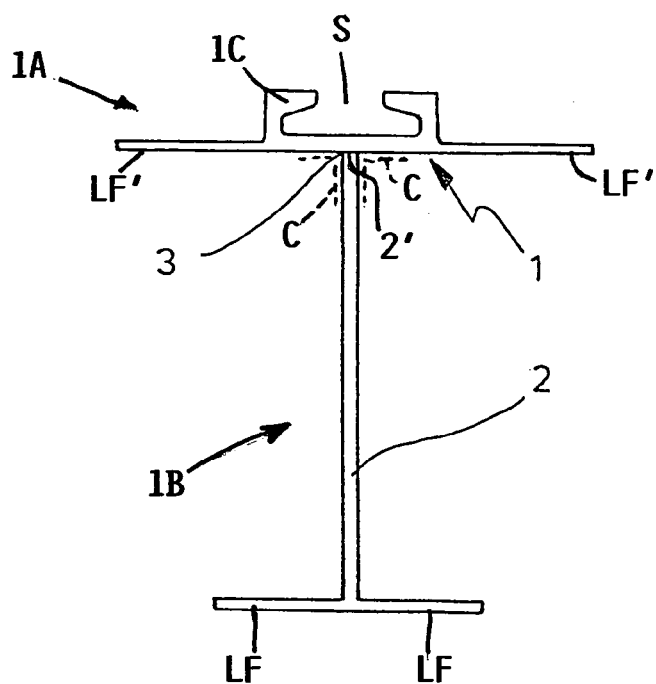

SEAT MOUNTING RAIL, PARTICULARLY FOR A COMMERCIAL AIRCRAFT

PRIORITY CLAIM

This application is based on and claims the priority under 35 U.S.C. §119 of German Patent Application 103 60 807.9, filed on Dec. 19, 2003, the entire disclosure of which is incorporated herein by reference.

FIELD OF THE INVENTION

The invention relates to a seat mounting rail for securing passenger seats to the cabin floor of a commercial airliner. Such rails have a lower portion for securing to the floor and an upper portion for securing seats to the rail. Such rails may also be used for securing loads to a floor.

BACKGROUND INFORMATION

Mounting rails for securing passenger seats in commercial aircraft are normally standardized. One such standard defining sheets is, for example, air traffic standard LN 29 890. The standard construction of such rails includes a lower mounting rail section having an $\Omega$- or a T-cross-sectional configuration. A chair securing upper rail section includes a C-cross-sectional configuration that opens upwardly into the cabin, whereby the upwardly facing opening is bounded on both sides by two flanges that reach toward and face each other to form a slot. The slot has spaced bores for the insertion of a seat footing. The seat securing upper section with the C-cross-sectional configuration and the rail mounting lower section are conventionally made of the same metal and are provided for example as extruded or milled stock.

Such chair mounting rails for the releasable securing of seats and other items in the C-portion of the upper rail section have standardized dimensions. German Patent Publication DE 42 24 821 A1 describes such a seat mounting rail. Further, Russian Patent RU 2,136,548 C1 discloses a device for the securing of passenger seats in which the mounting rail comprises edge shaped elements for the securing of the passenger seats in the mounting rail. U.S. Patent Publication U.S. Pat. No. 6,554,225 B1 discloses an arrangement of mounting rails in a lightweight floor construction for an aircraft. The floor is constructed for mounting rails having a T-cross-sectional configuration in the floor structure of an aircraft.

Mounting rails used in the known constructions are generally made of a high strength aluminum alloy with due regard to weight considerations. High strength aluminum alloys of the aluminum-zinc-group are particularly suitable for manufacturing conventional seat mounting rails. These aluminum zinc alloys are also referred to as so-called 7XXX alloys which have a high mechanical strength. Thus, these alloys have been recognized as particularly suitable for manufacturing seat mounting rails which are exposed to high mechanical loads in an aircraft structure.

However, it has been found that satisfying mechanical characteristics alone is not entirely satisfactory since other characteristics are also required. For example, a resistance against corrosion is important for seat mounting rails in an aircraft since the floor in the aircraft cabin is exposed to a multitude of corrosive influences or loads such as spilled liquids, condensed moisture, and the like. A possible measure for preventing corrosion of the seat mounting rails is the use of additional rail coverings as is disclosed in U.S. Pat. No. 6,498,297 B2 and U.S. Pat. No. 4,475,701. Another possibility of protecting seat mounting rails against corrosion is to increase the corrosion resistance of the rail material itself. This approach requires using corrosion resistant materials for manufacturing the rails. Thus it is known to make the entire seat mounting rail of high strength titanium alloys, particularly as defined in the alloy material Ti-6Al-4V.

The use of titanium alloys for manufacturing seat mounting rails clearly has the advantage of a material highly resistant to corrosion. However, titanium alloys are substantially more expensive than aluminum alloys and additionally have a higher density than aluminum alloys which is not advantageous with regard to the constant need for weight reductions in the manufacture of commercial aircraft. More specifically, a seat mounting rail of a titanium alloy is about 30% heavier than a comparable seat mounting rail made of a high strength aluminum alloy. As a result, seat rails made of high strength titanium alloys increase the overall floor weight of a commercial aircraft by several hundred kilograms. At the same time, the use of seat mounting rails made of titanium alloys makes the floor structure substantially more expensive so that the described solution of the corrosion problem is economically not acceptable. More specifically, solving the corrosion problem by a titanium seat mounting rail which is about ten times more expensive than a comparable conventional aluminum alloy rail is not acceptable.

OBJECTS OF THE INVENTION

In view of the foregoing it is the aim of the invention to achieve the following objects singly or in combination:

to provide a seat mounting rail for a commercial aircraft which rail is corrosion resistant while simultaneously satisfying the requirements for a minimal weight and economically affordable costs;

to form an upper and a lower rail section of different materials and to join both sections by a thermal joining operation; and to avoid or at least minimize weight increases in the joint or interconnection between the two rail sections.

The invention further aims to avoid or overcome the disadvantages of the prior art, and to achieve additional advantages, as apparent from the present specification. The attainment of these objects is, however, not a required limitation of the claimed invention.

SUMMARY OF THE INVENTION

The above objects have been achieved according to the invention by making the upper seat securing rail section of a titanium alloy and making the lower mounting rail section of an aluminum alloy, and wherein both sections are thermally interconnected to form a thermal interconnection bond or joint between the two sections. Preferably, the thermal interconnection is formed as a laser welding seam also referred to as a laser weld. More specifically, the laser weld is preferably a butt weld so that no extra material is needed for forming the interconnection between the two sections by a laser beam. Preferably, the upper edge of the lower section fits snugly into a groove of the upper section prior to the welding.

The formation of the upper rail section for securing the seats of a titanium alloy significantly improves the corrosion resistance of the entire rail. Further, the combination of an upper rail section of a titanium alloy with a lower rail section of an aluminum alloy avoids a significant weight increase while simultaneously providing an economical solution to the corrosion problem.

It has been found to be particularly advantageous if only the area of the mounting rail that is exposed to corrosion media is formed by the heavier and more expensive titanium to achieve the desired corrosion resistance while simultaneously using the lighter and less costly aluminum alloy for the mounting section. As mentioned, unnecessary material is not required for the formation of the laser weld so that the butt weld does not add any weight to the finished rail. As a result, the weight of the entire rail is only slightly higher than the weight of a rail made entirely of aluminum, or an aluminum alloy or a magnesium alloy. Yet, the corrosion resistance of the so-called crown area or top area with the slot in which the seats are mounted, provides an excellent corrosion protection just as a rail that would be made entirely of titanium. Thus, the invention has achieved an optimal compromise between the weight requirement on the one hand and the corrosion resistance requirement on the other hand, compared to a rail made entirely of titanium as well as in comparison to a rail that comprises titanium and aluminum components that require an overlap in order to connect the two components with each other, for example by adhesive bonding, riveting, or screw connections. Such overlapping areas add disadvantageously, weight to the entire rail and are not as easily manufactured in an economical way as compared to the formation of a laser butt weld. Moreover, the butt weld prevents the presence of an electrolyte such as condensation water between the two components, thereby avoiding any danger of an increased corrosion in an overlapping area.

BRIEF DESCRIPTION OF THE DRAWINGS

In order that the invention may be clearly understood, it will now be described in connection with example embodiments thereof, with reference to the accompanying drawings, wherein:

FIG. 1 is a perspective view of a seat mounting rail according to the invention comprising two rail sections made of different materials, namely titanium alloys and aluminum alloys;

FIG. 2 is an end view of the rail of FIG. 1; and

FIG. 3 is an enlarged view of a modified weld interconnection between the top edge of the web of the lower rail section fitting into a groove of the upper rail section.

DETAILED DESCRIPTION OF A PREFERRED EXAMPLE EMBODIMENT AND OF THE BEST MODE OF THE INVENTION

The two section or two component seat mounting rail 1 according to the invention comprises an upper rail section 1A and a lower rail section 1B which is preferably divided into a plurality of lower rail portions 2. The lower rail portions 2 are spaced from one another along the length of the rail, thereby further reducing the weight of the entire seat mounting rail 1. A bi-metallic interconnection 3 is formed between the upper rail section 1A and the lower rail portions 2, whereby the respective butt weld extends along the upper edge of the webs of the lower rail portions 2 which are also provided with lateral flanges LF for mounting the rail to or in a floor.

The chair securing upper section 1A has a central C-cross-sectional configuration 1C with lateral flanges LF' extending away from the C-configuration 1C with the slot S facing up. Mounting holes are not shown in the C-configuration 1C. However, such holes may be provided as needed and as is conventional. The bi-metal interconnection 3 is preferably a butt joint between the upper edge 2' as shown in FIG. 2 of the web portions 2 and the downwardly facing surface of the C-configuration 1C. Thus, the lateral flanges LF' and the C-configuration are made of a titanium alloy.

The rail section 1A can be produced with its so-called crown having the C-configuration 1C either by chip removal or by extrusion pressing, whereby a titanium alloy of high strength such as Ti-6Al-4V is preferably used. The web portions 2 of the lower rail section 1B and the lateral flanges LF that form the chord of the inverted T-configuration is made of aluminum, preferably a high strength aluminum alloy AA 6013. The production of the inverted T-configuration of the portions 2 of the lower section 1B can use aluminum or aluminum alloy sheet material or plate material, whereby the individual sections can be formed by chip removing, working such as sawing, milling or cutting operations, such as water jet cutting or laser beam cutting to provide the desired geometry of the web portions 2 and the lower chord or flanges LF. These components then can be interconnected by welding, such as laser welding, to provide a thermal interconnection with a T-butt joint. Alternatively, the lower sections or portions 2 may be formed individually by a milling operation to make single pieces from thicker plate material.

As mentioned, once the lower section 1B is formed, the two sections 1A and 1B are interconnected by a thermal method, particularly a laser welding, whereby the sections are pressed together to form a butt joint or a groove butt joint (I-joint). For this purpose the C-configuration 1C or so-called crown is machined to provide a socket or groove G of a few millimeters in width and depth. The upper edge 2' of the web portion 2 is inserted into the groove G as shown in FIG. 3. The groove G has a length corresponding to the longitudinal axial length of the respective web portion 2. Thus, the width and length of the groove is so selected that the thickness of the web 2 fits into the groove prior to a laser beam welding operation to form a metallurgical bi-metal bond or interconnection.

It is also advantageous to at least cover the surface area immediately adjacent and along the interconnection are 3 with a corrosion preventive coating or insulation to protect the interconnection area directly against a corrosive medium.

FIG. 3 shows the details of the above described interconnection between the top edge 2' of the web 2 and the upper rail section 1A with its groove G. The top edge 2' preferably, but not necessarily, fits snugly into the groove G. A laser weld is then formed to join the two sections 1A and 1B to each other. The corrosion protective coating is shown at C. The coating C is applied to cover the laser weld.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A seat mounting rail for securing a seat to a floor of a commercial aircraft, said seat mounting rail comprising a seat securing upper rail section made of a first metal and a rail mounting lower rail section made of a second metal, wherein said first metal is a titanium alloy and wherein said second metal is an aluminum alloy, said seat mounting rail further comprising a thermal interconnection joint between said first and second metals.

2. The seat mounting rail of claim 1, wherein said thermal interconnection joint is a laser formed weld.

3. The seat mounting rail of claim 2, wherein said laser formed weld is a butt weld.

4. The seat mounting of claim 1, wherein said thermal interconnection joint is a butt weld.

5. The seat mounting rail of claim 1, wherein said seat securing upper rail section has a sectional C-configuration and lateral flanges extending in opposite directions away from said C-configuration, wherein said rail mounting lower rail section comprises an inverted T-configuration with a top edge, and wherein said thermal interconnection joint is a laser formed butt weld between said top edge of said inverted T-configuration and a facing surface of said C-configuration that faces said top edge.

6. The seat mounting rail of claim 5, wherein said laser formed butt weld extends centrally between edges of said flanges along said C-configuration.

7. The seat mounting rail of claim 5, wherein said rail mounting lower rail section comprises a plurality of rail portions spaced from each other along said facing surface of said C-configuration.

8. The seat mounting rail of claim 1, further comprising a corrosion protective coating positioned for protecting said interconnection.

9. The seat mounting rail of claim 1, wherein said upper rail section comprises a groove (G) opening downwardly, and wherein said lower rail section has a top edge (2') welded into said groove.

* * * * *

UNITED STATES PATENT AND TRADEMARK OFFICE
CERTIFICATE OF CORRECTION

PATENT NO.        : 7,100,885 B2  
APPLICATION NO. : 11/018589  
DATED             : September 5, 2006  
INVENTOR(S)      : Zerner Page 1 of 1

It is certified that error appears in the above-identified patent and that said Letters Patent is hereby corrected as shown below:

On Title page,  
Item [75], Inventor,  
Replace "Syke" by --Varel--;  
Item [56], References Cited, FOREIGN PATENT DOCUMENTS,  
Add --DE    42 24 821   2/1994  
       DE   198 02 542   8/1999  
       RU    2 136 548   9/1999--;

Column 5,  
Line 5, after "seat mounting", insert --rail--.

Signed and Sealed this

Third Day of April, 2007

JON W. DUDAS  
*Director of the United States Patent and Trademark Office*

UNITED STATES PATENT AND TRADEMARK OFFICE
CERTIFICATE OF CORRECTION

PATENT NO.         : 7,100,885 B2
APPLICATION NO. : 11/018589
DATED                  : September 5, 2006
INVENTOR(S)        : Zerner It is certified that error appears in the above-identified patent and that said Letters Patent is hereby corrected as shown below:

<u>Title page,</u>
Item [75], Inventor,
Replace "Syke" by --Varel--;
Item [56], References Cited, FOREIGN PATENT DOCUMENTS,
Add --DE      42 24 821      2/1994
       DE      198 02 542      8/1999
       RU      2 136 548      9/1999--;

<u>Column 5,</u>
Line 5, after "seat mounting", insert --rail--.

Signed and Sealed this

Fifteenth Day of May, 2007

JON W. DUDAS
*Director of the United States Patent and Trademark Office*